United States Patent
Miyamoto

(10) Patent No.: US 9,232,092 B2
(45) Date of Patent: Jan. 5, 2016

(54) ELECTRONIC APPARATUS THAT SELECTIVELY TRANSMITS SCREEN DATA CHANGES BASED ON EXCLUSIONARY CONDITIONS

(71) Applicant: KYOCERA Document Solutions Inc.

(72) Inventor: Takanori Miyamoto, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/467,480

(22) Filed: Aug. 25, 2014

(65) Prior Publication Data

US 2015/0062608 A1 Mar. 5, 2015

(30) Foreign Application Priority Data

Aug. 29, 2013 (JP) ................................. 2013-178664

(51) Int. Cl.
G06F 3/12 (2006.01)
G09G 5/00 (2006.01)
H04N 1/00 (2006.01)
G06F 3/14 (2006.01)

(52) U.S. Cl.
CPC .......... H04N 1/00408 (2013.01); G06F 3/1423 (2013.01); G06F 3/1454 (2013.01); H04N 1/00129 (2013.01); G09G 2320/103 (2013.01); G09G 2330/021 (2013.01); G09G 2340/0435 (2013.01); G09G 2360/08 (2013.01); H04N 2201/0089 (2013.01); H04N 2201/0094 (2013.01)

(58) Field of Classification Search
CPC ........................... G06F 3/1454; H04N 1/6052

USPC .......... 709/217; 345/418, 520, 522, 660, 619; 382/218

See application file for complete search history.

(56) References Cited

U.S. PATENT DOCUMENTS

| 8,120,621 | B1 | 2/2012 | Ogrinc et al. |
| 8,538,197 | B2* | 9/2013 | Kobayashi et al. ............ 382/284 |
| 2006/0136828 | A1* | 6/2006 | Asano ............................ 715/751 |
| 2009/0285493 | A1* | 11/2009 | Itoh ................................ 382/218 |
| 2012/0194542 | A1* | 8/2012 | Matsui .................. G06F 3/1454 345/619 |
| 2012/0229480 | A1 | 9/2012 | Guo et al. |
| 2013/0219012 | A1 | 8/2013 | Suresh et al. |

FOREIGN PATENT DOCUMENTS

| JP | 645691 | 3/1995 |
| JP | 2008-234389 | 10/2008 |
| JP | 2008-288721 | 11/2008 |

* cited by examiner

*Primary Examiner* — Benny Q Tieu
*Assistant Examiner* — Juan M Guillermety

(57) ABSTRACT

A display processing unit causes a display device to display a screen on the basis of screen image data. A screen change detecting unit watches the screen image data and detects a change of the screen image data. A transmission processing unit transmits the screen image data to a monitoring apparatus if the screen change detecting unit detected a change of the screen image data. A storage device stores excluding condition data. The transmission processing unit does not transmit the screen image data if the detected change of the screen image data satisfies the excluding condition specified by the excluding condition data and transmits the screen image data if the detected change of the screen image data does not satisfy the excluding condition specified by the excluding condition data.

8 Claims, 4 Drawing Sheets

ELECTRONIC APPARATUS THAT SELECTIVELY TRANSMITS SCREEN DATA CHANGES BASED ON EXCLUSIONARY CONDITIONS

CROSS-REFERENCE TO RELATED APPLICATIONS

This application relates to and claims priority rights from Japanese Patent Application No. 2013-178664, filed on Aug. 29, 2013, the entire disclosures of which are hereby incorporated by reference herein.

BACKGROUND

1. Field of the Present Disclosure

The present disclosure relates to an electronic apparatus.

2. Description of the Related Art

In a system, an image of a screen displayed on an operation panel in an electronic apparatus such as a multi function peripheral is displayed on a remote apparatus. In such a case, for example, every time when an image of the screen is changed, image data of the image is transmitted through a network to the remote apparatus.

Various techniques are proposed on the transmission for image data of a screen.

An image of a screen in an electronic apparatus such as the aforementioned one is changed in various manners on the basis of a user operation, a status change in the electronic apparatus, displayed contents and the like, and in accordance with it, the load changes due to a transmission process of image data of the screen, and therefore, the load status in the electronic apparatus widely changes due to the transmission of the image data of the screen and consequently a delay may occur in another process.

SUMMARY

An electronic apparatus according to an aspect of the present disclosure includes a display device, a display processing unit, a screen change detecting unit, a transmission processing unit, and a storage device. The display device is configured to display a screen. The display processing unit is configured to cause the display device to display the screen on the basis of screen image data. The screen change detecting unit is configured to watch the screen image data and detect a change of the screen image data. The transmission processing unit is configured to transmit the screen image data to a predetermined monitoring apparatus if the screen change detecting unit detected a change of the screen image data. The storage device is configured to store excluding condition data that indicates a condition to prohibit transmitting the screen image data to the predetermined monitoring apparatus when a change of the screen image data is detected. The transmission processing unit is further configured not to transmit the screen image data if the detected change of the screen image data satisfies the excluding condition specified by the excluding condition data and to transmit the screen image data if the detected change of the screen image data does not satisfy the excluding condition specified by the excluding condition data.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
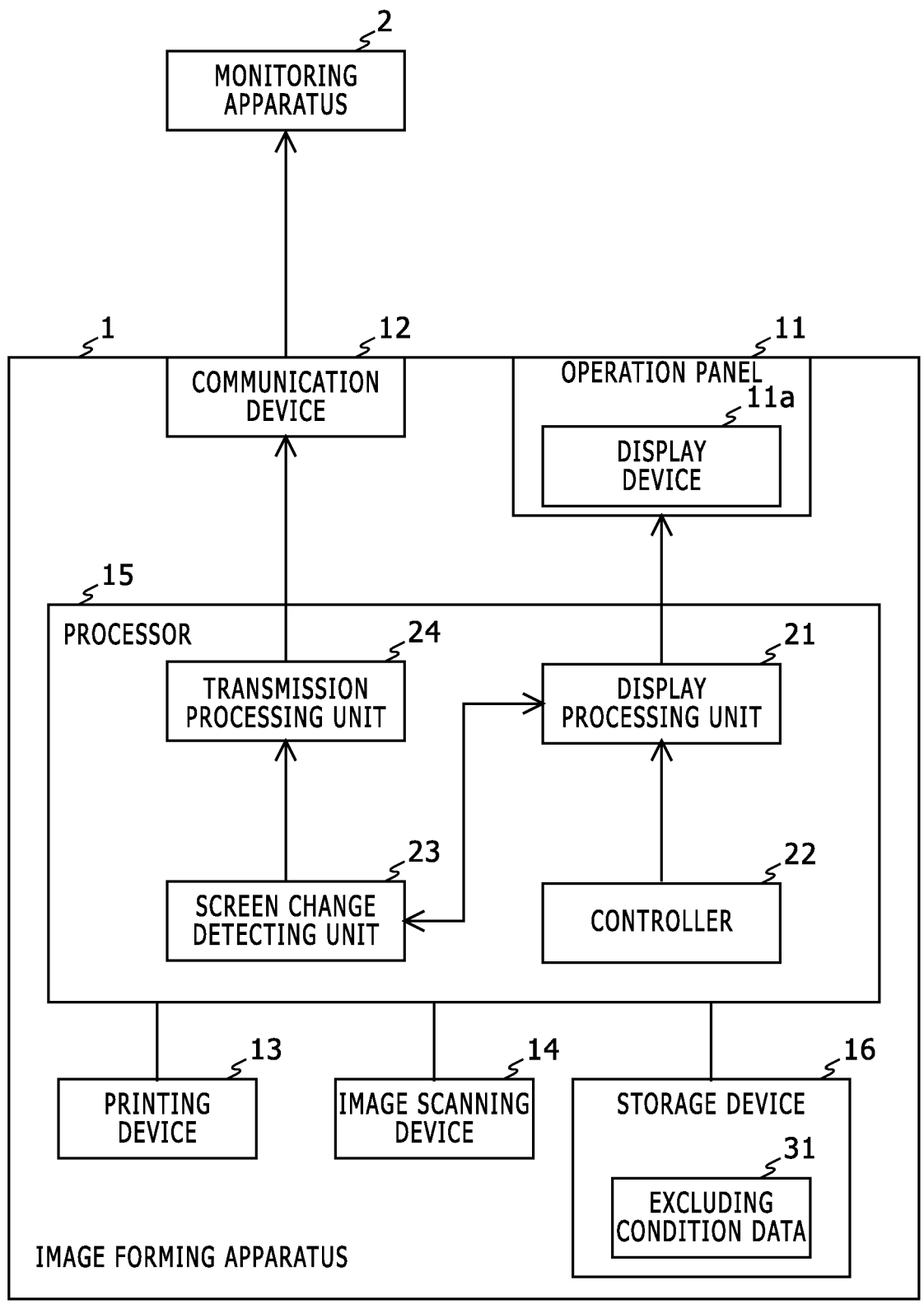
FIG. 1 shows a block diagram that indicates a configuration of an image forming apparatus as an electronic apparatus according to an embodiment of the present disclosure.

FIG. 1 shows a block diagram that indicates a configuration of an image forming apparatus as an electronic apparatus according to an embodiment of the present disclosure.

The image forming apparatus 1 in FIG. 1 is connected through a network 2 to a remote monitoring apparatus 2. In this embodiment, the image forming apparatus 1 as an instance of the electronic apparatus is a multi function peripheral. However, the image forming apparatus 1 may be another apparatus having a printing function such as a printer, a facsimile device, or a copier. The monitoring apparatus 2 receives screen image data of a screen displayed on a display device 11a in the image forming apparatus 1 from the image forming apparatus 1 and records the screen image data and/or displays an image that indicates the screen of the image forming apparatus 1 on the basis of the screen image data.

As shown in FIG. 1, this image forming apparatus 1 includes an operation panel 11, a communication device 12, a printing device 13, an image scanning device 14, a processor 15, and a storage device 16.

The operation panel 11 includes a display device 11a such as a liquid crystal display and an input device 11b such as a touch panel, and displays an operation screen for a user and detects a user operation.

Further, the communication device 12 is a device capable of connecting through a network or the like to the monitoring apparatus 2 and performing data communication in accordance with a predetermined communication protocol.

Furthermore, the printing device 13 is an internal device that prints a document image on a printing paper sheet, for example, in an electrophotographic manner. The printing device 13 performs printing on the basis of output image data generated by performing predetermined image processing such as rasterizing, color conversion, or a screen process for an original image data.

Furthermore, the image scanning device 14 is an internal device that optically scans a document image from a document, and generates image data of the document image.

Furthermore, the processor 15 is a computer which includes a CPU (Central Processing Unit), a ROM (Read Only Memory), and a RAM (Random Access Memory), loads a program from the ROM, the storage device 16 or the like to the RAM, and executes the program with the CPU to act as various processing units.

Furthermore, the storage device 16 is a non volatile storage device such as a flash memory, and stores sorts of data and programs.

The processor 15 acts as a display processing unit 21, a controller 22, a screen change detecting unit 23, and a transmission processing unit 24.

The display processing unit 21 writes screen image data in an unshown video memory area, and causes the display device 11a to display a screen on the basis of the screen image data stored in the video memory area.

The controller 22 controls internal devices such as the printing device 13, executes a job, and instructs the display processing unit 21 to write the screen image data according to a user operation, a status of the image forming apparatus 1, a job status and/or the like.

The screen change detecting unit 23 watches the screen image data in the video memory area and detects a change of the screen image data. Here the screen change detecting unit 23 watches each pixel value in the screen image based on the screen image data, and determines that the screen image data changed when at least one pixel value changed.

The transmission processing unit 24 has a function to transmit the screen image data to the monitoring apparatus 2 using the communication device 12 when the screen change detecting unit 23 detects a change of the screen image data.

Further, in the storage device 16, excluding condition data 31 has been stored. The excluding condition data 31 is data that indicates a condition to prohibit transmitting the screen image data to the monitoring apparatus 2 when a change of the screen image data is detected.

Further, when the screen change detecting unit 23 detects a change of the screen image data, the transmission processing unit 24 does not transmit the screen image data if the detected change of the screen image data satisfies the excluding condition specified by the excluding condition data 31, and transmits the screen image data if the detected change of the screen image data does not satisfy the excluding condition specified by the excluding condition data 31.

Furthermore, in this embodiment, the transmission processing unit 24 does not transmit the screen image data when a transmission frequency of the screen image data exceeds a predetermined transmission frequency threshold value, even if the detected change of the screen image data does not satisfy the excluding condition specified by the excluding condition data 31.

Furthermore, in this embodiment, the transmission processing unit 24 changes the transmission frequency threshold value on the basis of either a transmission time or a transmission rate of the screen image data, after transmitting the screen image data. In this process, the transmission processing unit 24 may change the transmission frequency threshold value on the basis of both either a transmission time or a transmission rate of the screen image data and a load status of this image forming apparatus 1 (e.g. the usage factor of the aforementioned CPU).

Furthermore, in this embodiment, the excluding condition data 31 includes a threshold value on a size (i.e. an area, a vertical size, a horizontal size or both vertical and horizontal sizes) of a change part in the screen as a condition; and the transmission processing unit 24 identifies a size of a change part in the screen on the basis of the screen image data when a change of the screen image data is detected; and if the identified size of the change part is less than the threshold value included in the excluding condition data 31, the transmission processing unit 24 determines that the condition of the excluding condition data 31 is satisfied and does not transmit the screen image data. Consequently, an object displayed as animation such as an animation icon is excluded from the screen change.

Furthermore, in this embodiment, the excluding condition data 31 includes excluded area information as a condition; and the transmission processing unit 24 identifies a change part in the screen on the basis of the screen image data when a change of the screen image data is detected; and if the identified change part is located within the excluded area specified by the excluded area information, the transmission processing unit 24 determines that the condition of the excluding condition data 31 is satisfied and does not transmit the screen image data.

Figure 2:
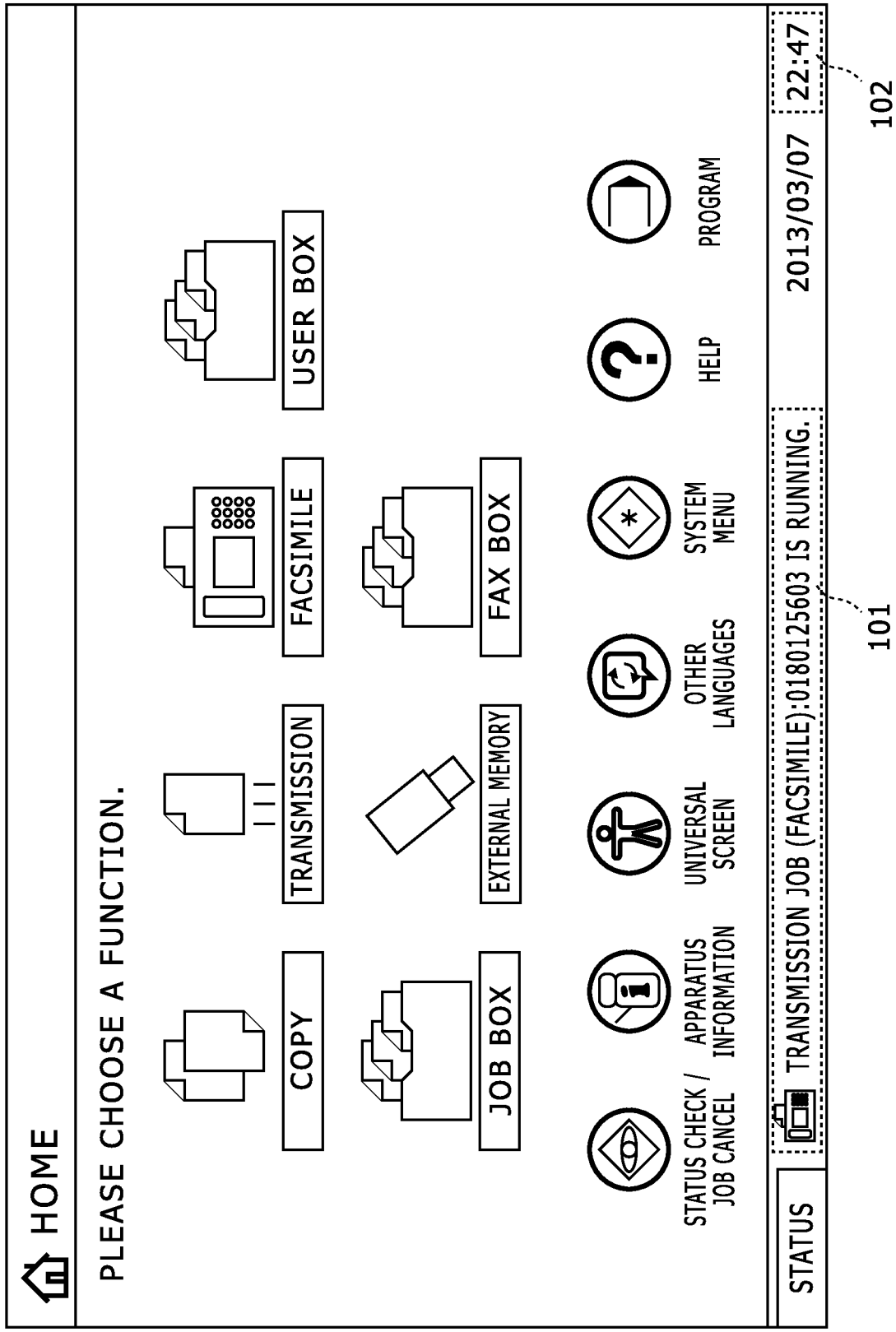
FIG. 2 shows a diagram that indicates an example of an excluded area specified by excluding condition data 31 in FIG. 1.

FIG. 2 shows a diagram that indicates an example of an excluded area specified by excluding condition data 31 in FIG. 1. For example, such as a job status notification area 101 or a time display area 102 shown in FIG. 2, the excluded area information specifies an area for which the monitoring by the monitoring apparatus 2 is unnecessary and in which image change frequently occurs.

Furthermore, in this embodiment, the excluding condition data 31 includes a shape of a change part in the screen as a condition; and the transmission processing unit 24 identifies a shape of a change part in the screen on the basis of the screen image data when a change of the screen image data is detected; and if the identified shape of the change part agrees with the shape included in the excluding condition data 31, the transmission processing unit 24 determines that the condition of the excluding condition data 31 is satisfied and does not transmit the screen image data.

Figure 3:
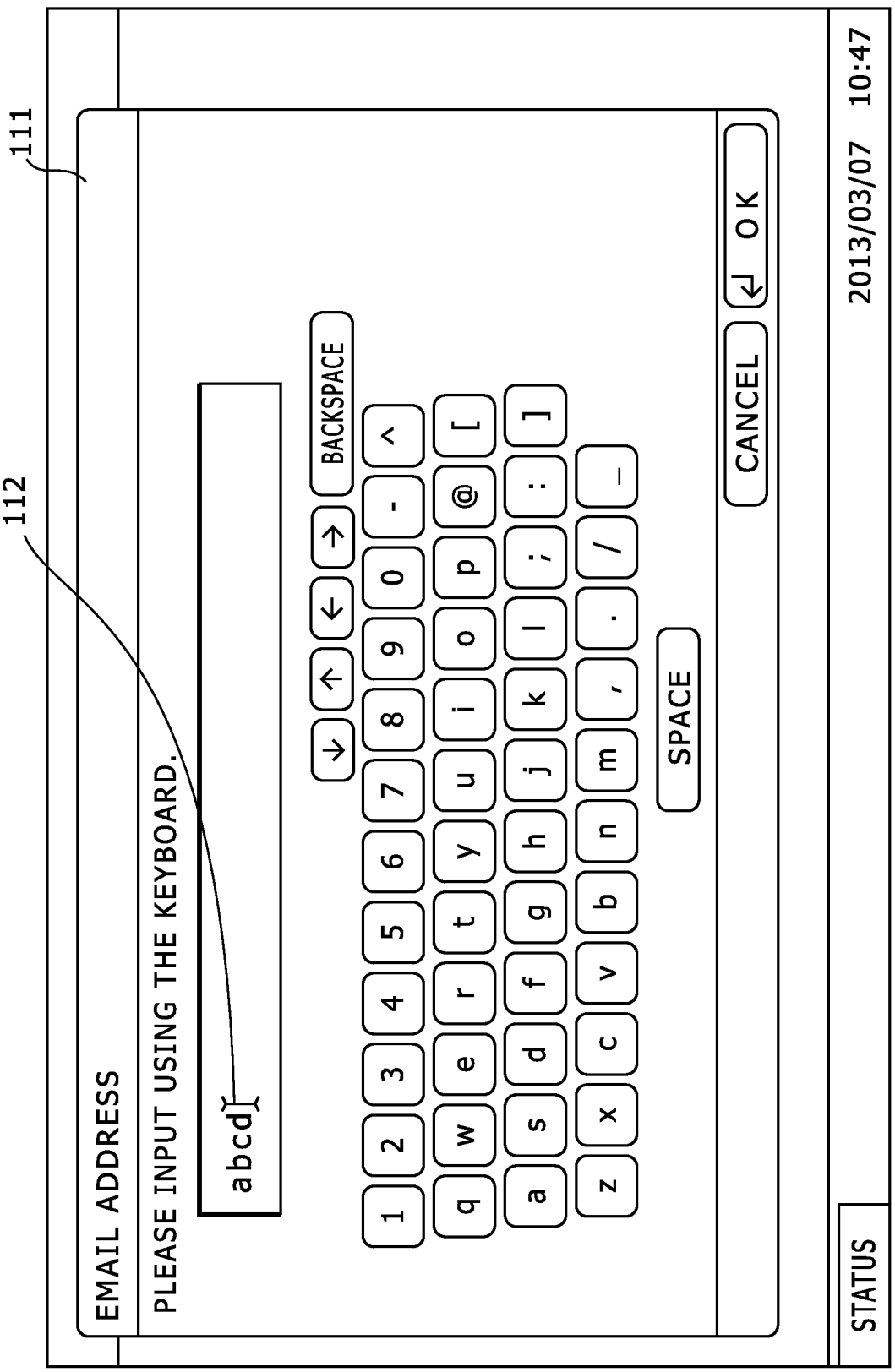
FIG. 3 shows a diagram that indicates an example of an excluded shape specified by excluding condition data 31 in FIG. 1.

FIG. 3 shows a diagram that indicates an example of an excluded shape specified by excluding condition data 31 in FIG. 1. As shown in FIG. 3, a shape of a cursor 112 displayed and blinking in a dialog 111 requiring text input is registered as an excluded shape in the excluding condition data 31. In this manner, a shape of a displayed and blinking object is registered as an excluded shape and consequently if the excluded shape is detected, then the screen image data is not transmitted regardless of the detecting place in the screen.

The following part explains a behavior of the aforementioned image forming apparatus 1.

Figure 4:
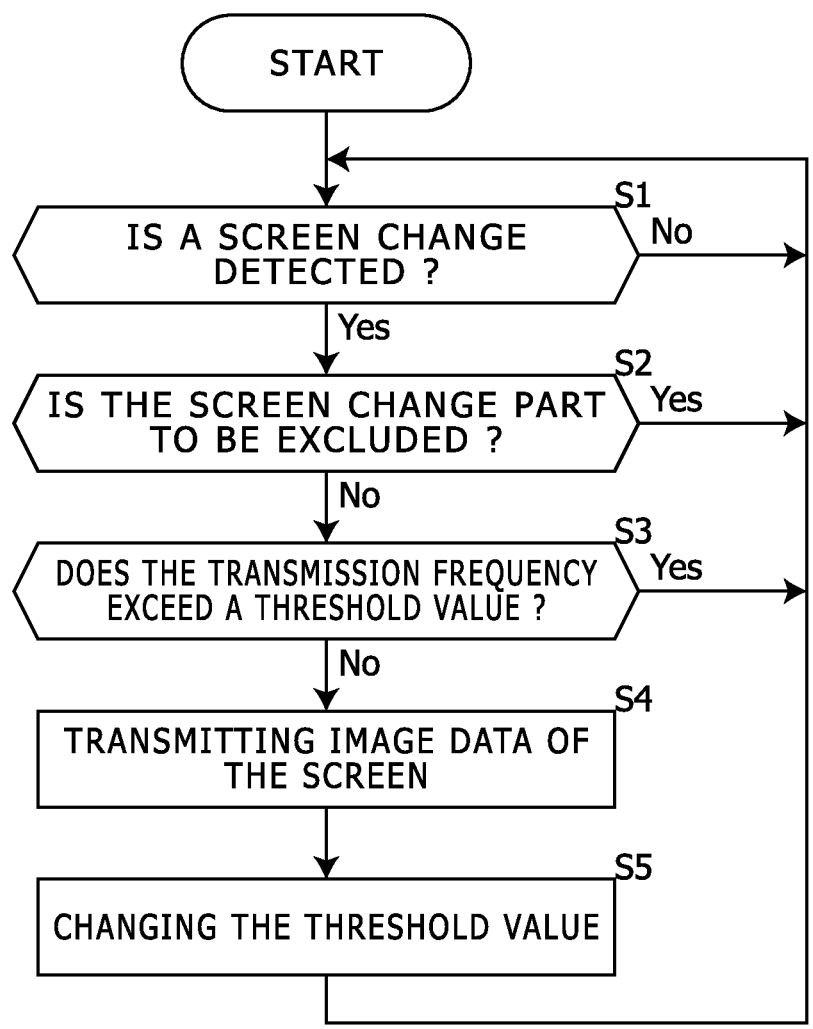
FIG. 4 shows a flowchart that explains a behavior on transmission of screen image data of the image forming apparatus 1 shown in FIG. 1.

FIG. 4 shows a flowchart that explains a behavior on transmission of screen image data of the image forming apparatus 1 shown in FIG. 1.

The screen change detecting unit 23 watches the screen image data in a predetermined video memory area (in Step S1), and notifies the transmission processing unit 24 of a change of the screen image data when detecting the change.

Upon receiving the notification of the change, the transmission processing unit 24 identifies a change part of the screen image data, and determines whether the change part satisfies the excluding condition specified by the excluding condition data 31 or not on the basis of the excluding condition data 31 (in Step S2).

If it is determined that the change part satisfies the excluding condition specified by the excluding condition data 31, then the transmission processing unit 24 does not perform the transmission of the screen image data corresponding to the notification of the change of the screen image data.

Contrarily, if it is determined that the change part does not satisfy the excluding condition specified by the excluding condition data 31, then the transmission processing unit 24 determines whether a transmission frequency of the screen image data exceeds a transmission frequency threshold value or not (in Step S3).

For example, the transmission frequency of the screen image data is the number of times the screen image data was transmitted within a most recent time period with a predetermined length (e.g. within one second).

If it is determined that the transmission frequency of the screen image data exceeds the transmission frequency threshold value, the transmission processing unit 24 does not perform the transmission of the screen image data corresponding to the notification of the change of the screen image data.

Contrarily, if it is determined that the transmission frequency of the screen image data does not exceed the transmission frequency threshold value, the transmission processing unit 24 transmits the screen image data to the monitoring apparatus 2 (in Step S4).

At this time, the transmission processing unit 24 measures a required time for the transmission of the screen image data (i.e. transmission time), and changes the transmission frequency threshold value on the basis of the transmission time, the transmission rate (=the size of the screen image data/the transmission time), or the like (in Step S5).

For example, a reference value of either the transmission time or the transmission rate has been set; and if the measured value of the transmission time is larger than its reference or the measured value of the transmission rate is less than its reference, then the transmission frequency threshold value is decreased, and if the measured value of the transmission time is less than its reference or the measured value of the transmission rate is larger than its reference, then the transmission frequency threshold value is increased.

As mentioned, in the aforementioned embodiment, the screen change detecting unit 23 watches the screen image data and detects a change of the screen image data. The transmission processing unit 24 does not transmit the screen image data if the detected change of the screen image data satisfies the excluding condition specified by the excluding condition data 31, and transmits the screen image data if the detected change of the screen image data does not satisfy the excluding condition specified by the excluding condition data 31.

Therefore, the screen image data is not transmitted for a screen change that monitoring by the remote monitoring apparatus 2 is unnecessary, and consequently due to the load caused by the transmission of the screen image data, a delay tends not to occur in another process.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An electronic apparatus, comprising:
a display device configured to display a screen;
a display processing unit configured to cause the display device to display the screen on the basis of screen image data;
a screen change detecting unit configured to watch the screen image data and detect a change of the screen image data;
a transmission processing unit configured to transmit the screen image data to a predetermined monitoring apparatus if the screen change detecting unit detected a change of the screen image data;
a storage device configured to store excluding condition data that indicates a condition to prohibit transmitting the screen image data to the predetermined monitoring apparatus when a change of the screen image data is detected;
wherein the transmission processing unit is further configured not to transmit the screen image data if the detected change of the screen image data satisfies the excluding condition specified by the excluding condition data and to transmit the screen image data if the detected change of the screen image data does not satisfy the excluding condition specified by the excluding condition data;
wherein the excluding condition data includes excluded area information as a condition; said excluded area information specifying an area in which the image changes frequently and
the transmission processing unit is further configured to identify a change part in the screen on the basis of the screen image data when a change of the screen image data is detected, and not to transmit the screen image data if the identified change part is located within the excluded area specified by the excluded area information.

2. The electronic apparatus according to claim 1, wherein the transmission processing unit is further configured not to transmit the screen image data when a transmission frequency of the screen image data exceeds a predetermined transmission frequency threshold value, even if the detected change of the screen image data does not satisfy the excluding condition specified by the excluding condition data.

3. The electronic apparatus according to claim 2, wherein the transmission processing unit is further configured to change the transmission frequency threshold value on the basis of either a transmission time or a transmission rate of the screen image data, after transmitting the screen image data.

4. The electronic apparatus according to claim 2, wherein the transmission processing unit is further configured to change the transmission frequency threshold value on the basis of both either transmission time or transmission rate of the screen image data and a load status of this electronic apparatus, after transmitting the screen image data.

5. The electronic apparatus according to claim 1, wherein:
the excluding condition data includes a threshold value on a size of a change part in the screen as a condition; and
the transmission processing unit is further configured to identify a size of a change part in the screen on the basis of the screen image data when a change of the screen image data is detected, and not to transmit the screen image data if the identified size of the change part is less than the threshold value included in the excluding condition data.

6. The electronic apparatus according to claim 1, wherein:
the excluding condition data includes a shape of a change part in the screen as a condition; and
the transmission processing unit is further configured to identify a shape of a change part in the screen on the basis of the screen image data when a change of the screen image data is detected, and not to transmit the screen image data if the identified shape of the change part agrees with the shape included in the excluding condition data.

7. The electronic apparatus according to claim 1, wherein said excluded area information specifies a status notification area.

8. The electronic apparatus according to claim 1, wherein said excluded area information specifies a time display area.

* * * * *